United States Patent
Kondo et al.

(10) Patent No.: US 7,357,339 B2
(45) Date of Patent: Apr. 15, 2008

(54) WET PULVERIZING OF POLYSACCHARIDES

(75) Inventors: Tetsuo Kondo, c/o Kyushu University, 10-1, Hakozaki 6-chome, Higashi-ku, Fukuoka-shi, Fukuoka-ken (JP); Mitsuhiro Morita, Fukuoka (JP); Kazuhisa Hayakawa, Joetsu (JP); Yoshiro Onda, Tokyo (JP)

(73) Assignees: Tetsuo Kondo, Fukuoka-ken (JP); Shin-etsu Chemical Co., Ltd., Tokyo (JP)

( * ) Notice: Subject to any disclaimer, the term of this patent is extended or adjusted under 35 U.S.C. 154(b) by 141 days.

(21) Appl. No.: 11/087,678

(22) Filed: Mar. 24, 2005

(65) Prior Publication Data

US 2005/0236121 A1 Oct. 27, 2005

(30) Foreign Application Priority Data

Mar. 26, 2004 (JP) ............... 2004-090799

(51) Int. Cl.
*B02C 19/00* (2006.01)
(52) U.S. Cl. ............... 241/1; 241/15; 241/30
(58) Field of Classification Search .......... 241/1, 241/38, 39, 15, 30
See application file for complete search history.

(56) References Cited

U.S. PATENT DOCUMENTS

| 4,374,702 A | 2/1983 | Turbak et al. |
| 4,483,743 A | 11/1984 | Turbak et al. |
| 4,533,254 A * | 8/1985 | Cook et al. ............... 366/176.1 |
| 5,547,848 A * | 8/1996 | Shinoki et al. ............... 435/7.9 |
| 5,681,600 A * | 10/1997 | Antinone et al. ............. 426/74 |
| 5,700,486 A * | 12/1997 | Canal et al. ................. 424/501 |
| 2004/0245357 A1* | 12/2004 | Karasawa ...................... 241/5 |

FOREIGN PATENT DOCUMENTS

| EP | 1 342 733 A1 | 10/2003 |
| GB | 2 066 145 A | 7/1981 |
| JP | 60-19921 | 5/1985 |
| JP | 6-49768 | 6/1994 |
| JP | 10-337457 | 12/1998 |
| JP | 2003-073229 | 12/2003 |

OTHER PUBLICATIONS

"Isogai Ed., Science of Cellulose, Asakura Publishing, 2003".
"Cellulose Society Ed., Dictionary of Cellulose, 2000, p. 80".
Jinping Zhou et al., Solubility of Cellulose in NaOH/Urea Aqueous Solution, Polymer Journal, vol. 32, No. 10, pp. 866-870 (2000).

* cited by examiner

*Primary Examiner*—Bena Miller
(74) *Attorney, Agent, or Firm*—Westerman, Hattori, Daniels & Adrian, LLP.

(57) ABSTRACT

Polysaccharide is wet pulverized by ejecting a liquid dispersion of polysaccharide from a pair of nozzles under a high pressure of 70 to 250 MPa to form a pair of jets so that the jets collide against each other. The nozzles are oriented to define a collision angle of 95-178° and the number of pulverizing cycles is adjusted such that the polysaccharide is pulverized to an average particle length which is equal to or less than ¼ of the initial average particle length while undergoing a reduction in degree of polymerization of less than 10%.

6 Claims, 3 Drawing Sheets

WET PULVERIZING OF POLYSACCHARIDES

CROSS-REFERENCE TO RELATED APPLICATION

This non-provisional application claims priority under 35 U.S.C. §119(a) on Patent Application No. 2004-090799 filed in Japan on Mar. 26, 2004, the entire contents of which are hereby incorporated by reference.

TECHNICAL FIELD

This invention relates to a method of wet pulverizing polysaccharides such as cellulose, chitin, chitosan or derivatives thereof to a finely divided dispersion approximate to a dispersion of molecules in water without inviting a substantial reduction in degree of polymerization.

BACKGROUND ART

Polysaccharides including cellulose are valuable as a biomass resource and used in various applications such as paper, film and fibers.

Unlike synthetic plastics, polysaccharides are generally difficult to melt by heating. Thus they must be once dissolved in solvents before they can be processed. However, it is yet difficult to dissolve polysaccharides. With respect to cellulose, for example, as described in J. Zhou and L. Zhang, Polymer Journal, 32, 10, 866 (2000) and Isogai Ed., Science of Cellulose, Asakura Publishing, 2003, cuprammonium solutions and solutions of cellulose treated with carbon disulfide and sodium hydroxide, known as "viscose," are on use from the past. Recently, a spinning process using N-methylmorpholine N-oxide was developed. The process requires high-temperature treatment and the recovery of chemicals for reuse and is not advantageous because of the energy and cost spent in forming and processing as well as the recovery.

These problems can be overcome by a process of dispersing polysaccharide in water uniformly and effecting wet milling without breaking the molecular structure for thereby dispersing polysaccharide particles to a state approximate to the molecular level.

The resulting dispersion of polysaccharide is gel-like and can be used as a cosmetic humectant component in toothpaste and cream, timed release gel preparations impregnated with drugs, fragrant preparations, thermal insulating materials and the like. Also films and forms obtained by drying the gel-like material can be utilized as wrapping material and containers. In these uses, as polysaccharides are more finely divided, they become more homogeneous and easier to form into products. If the degree of polymerization is not reduced, the products possess necessary strength and durability.

However, polysaccharides generally have strong hydrogen bonds formed within and between molecules. If pulverizing is effected to such an extent to break such hydrogen bonds, ether bonds that join molecular chains together are often broken at the same time. Pulverizing is accomplished, but the pulverized polysaccharide has a lower degree of polymerization and becomes of poor quality.

For water-insoluble cellulose, JP-B 60-19921 describes a method of imparting a high velocity to a dispersion of cellulose in water under a high pressure difference of at least 3,000 psi (20.6 MPa), followed by an impact for rapid deceleration. In this method, fibrillated cellulose is finely divided to a size of about ¼ or less by repeating about 20 pulverizing cycles. However, if cellulose is pulverized to such a size, the cellulose in a copper ethylenediamine solution has an intrinsic viscosity of 7.55 dl/g which is reduced from the viscosity of 8.83 dl/g prior to the pulverizing. When a degree of polymerization is calculated from this value according to the equation: $[\eta]$ (ml/g)=$1.67 \times [Dp]^{0.71}$ wherein $[\eta]$ is an intrinsic viscosity and Dp is a degree of polymerization, described in the Cellulose Society Ed., Dictionary of Cellulose, 2000, page 80, it is seen that after 20 pulverizing cycles at 20° C. and 90° C., the degree of polymerization is decreased 20% from the initial. A comparison of a single pulverizing cycle and 10 pulverizing cycles at 20° C. and 90° C. reveals a reduction of at least 10% in degree of polymerization.

JP-B 6-49768 describes a process of subjecting a suspended liquid dispersion of a cellulose derivative, low-substituted hydroxypropyl cellulose dispersed in water to frictional grinding or high-pressure dispersion whereby the low-substituted hydroxypropyl cellulose is frictionally ground into a highly viscous gel-like material. It is not described that the drop of degree of polymerization by frictional grinding is less than 10%.

Although it is known that polysaccharide is processed by frictional grinding, high-pressure impact or wet pulverizing following dispersion, it would be desirable to finely pulverize polysaccharide with minimized breakage of molecular chains while suppressing a reduction in degree of polymerization to less than 10%.

SUMMARY OF THE INVENTION

An object of the invention is to provide a method of wet pulverizing a polysaccharide while avoiding any change of polysaccharide structure and minimizing a reduction in degree of polymerization.

Studying the pulverization of polysaccharide by collision of high-pressure fluid jets, the inventors have discovered that if the angle of collision between fluid jets and the number of pulverizing cycles are controlled optimum, the polysaccharide structure can be kept unchanged and a reduction of polymerization degree is minimized.

The present invention provides a method of wet pulverizing a polysaccharide in particle form having an initial average particle length, comprising ejecting a liquid dispersion of polysaccharide from a pair of nozzles under a high pressure of 70 to 250 MPa to form a pair of jets so that the jets collide against each other for thereby pulverizing the polysaccharide. The nozzles are angled such that the jets collide against each other at a point distant from outlets of the nozzles and at an appropriate angle and/or the number of ejecting steps is adjusted to subject the polysaccharide to an appropriate number of pulverizing cycles, whereby the polysaccharide is pulverized to an average particle length which is equal to or less than ¼ of the initial while undergoing a reduction in degree of polymerization of less than 10%.

In a preferred embodiment, the polysaccharide is pulverized to an average particle length which is equal to or less than 10 μm and optionally, an average particle breadth which is equal to or less than 10 μm, while undergoing a reduction in degree of polymerization of less than 10%. The angle of collision between the jets is typically in a range of 95 to 178 degrees. The number of pulverizing cycles is preferably from 1 to 200.

The method may further comprise, after the wet pulverizing step, centrifuging the liquid dispersion of polysaccharide to collect polysaccharide submicron particles having an average particle length which is less than 1 μm.

The polysaccharide is typically selected from among cellulose or derivatives thereof, chitin or derivatives thereof, and chitosan or derivatives thereof. More preferably, the cellulose is crystalline cellulose as prescribed in the Japanese Pharmacopoeia, 14th Edition.

The method of wet pulverizing polysaccharides according to the invention is successful in producing finely divided forms of polysaccharides without any change of the polysaccharide structure. The reduction in degree of polymerization by pulverizing is minimized. The invention enables easy molding and processing of polysaccharides including cellulose.

DESCRIPTION OF THE PREFERRED EMBODIMENTS

Figure 1:
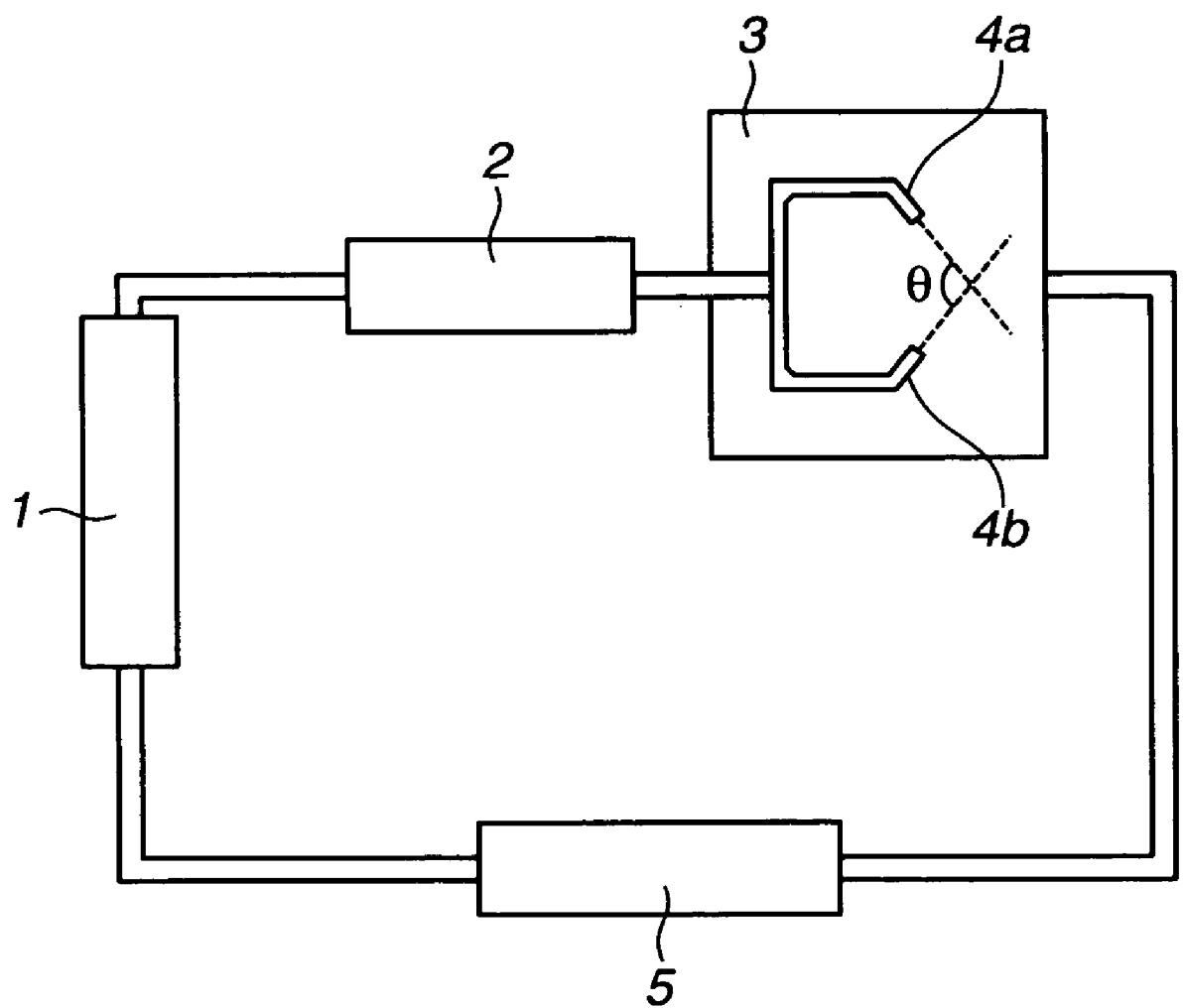
FIG. 1 schematically illustrates a pulverizing system for use in the practice of the inventive method.

The method of the invention is to wet pulverize polysaccharides. Examples of polysaccharides to be pulverized include naturally occurring and cultured polysaccharides and ethers, esters, cationic and anionic derivatives thereof, such as cellulose, chitin, chitosan, starch, pullulan, carrageenan, agar, curdlan, furcellaran, xanthan gum, guar gum, gum arabic, sizofiran, hyaluronic acid, alginic acid, sodium alginate, pectin, and welan gum. Of these, suitable cellulose derivatives include methyl cellulose, hydroxyethyl cellulose, hydroxypropyl methyl cellulose, low-substituted hydroxypropyl cellulose, hydroxypropyl cellulose, carboxymethyl cellulose, acetyl cellulose, nitrocellulose, carboxymethyl nitrocellulose, hydroxypropyl methyl cellulose acetate succinate, cellulose acetate phthalate, hydroxypropyl methyl cellulose phthalate, cationic hydroxyethyl cellulose, hydrophobic hydroxypropyl methyl cellulose, etc. Crystalline celluloses from which amorphous portions are removed to a maximum possible extent, that is, crystalline celluloses as prescribed in the Japanese Pharmacopoeia, 14th Edition are also useful.

Polysaccharides have a degree of polymerization which is not critical. Preferred polysaccharides have a degree of polymerization of 50 to 100,000, and more preferably 100 to 10,000 so that polysaccharides even after pulverizing have a practically acceptable degree of polymerization. If the degree of polymerization is too low, pulverized products which are applicable to form practically acceptable films or sheets are not obtainable. If the degree of polymerization is too high, it may be difficult to suppress a reduction of degree of polymerization by pulverization to less than 10%.

It is noted that the degree of polymerization of polysaccharide can be determined according to the equation between degree of polymerization and viscosity described in Polymer Handbook, 4th Edition, John Wiley & Sons, Feb. 22, 1999, or by the light scattering measurement, GPC-MALLS, osmotic pressure, and ultra-centrifugal methods described in Matsushita, Basic Chemistry Course—Polymer Chemistry, Maruzen, Chapter II Physical properties.

The polysaccharide in particle form prior to pulverization has an average particle length and average particle breadth which are not critical. Typically the average particle length is in a range of 10 to 300 μm, and preferably 50 to 200 μm.

It is noted that the average particle length and breadth can be measured by a light scattering apparatus, laser microscope, electron microscope or the like. The average particle length is determined by measuring dimensions of particles under a microscope, selecting 10 to 200, preferably 30 to 80 longer dimensions, and calculating an average. The average particle length should be such that polysaccharide particles may flow through a conduit to the pulverizing system.

The dispersing medium of the polysaccharide liquid dispersion is not particularly limited as long as it is a liquid in which polysaccharides are not dissolvable. For cellulose and derivatives thereof, for example, water is the preferred dispersing medium. For starch and other polysaccharides which are dissolvable in water when heated, water is not preferred because the temperature is elevated during the pulverizing process, but organic solvents such as n-hexane are preferred. In the wet pulverizing method of the invention wherein heat is generated during the process, it is preferred to use dispersing media having a higher boiling point, for example, polyhydric alcohols such as glycerol and propylene glycol and other high-molecular weight solvents. High-molecular weight silicone fluids having a relatively high boiling point are also useful. In general, polysaccharide-insoluble solvents having a boiling point of at least 100° C., typically 110 to 200° C. under atmospheric pressure are preferred.

The polysaccharide dispersion should preferably have a concentration that allows the dispersed slurry to flow through the conduit of the pulverizing system, specifically 1 to 10% by weight.

The inventive method of wet pulverizing particulate polysaccharide includes ejecting a liquid dispersion of polysaccharide from a pair of nozzles under a high pressure of 70 to 250 MPa to form a pair of jets so that the jets collide against each other for thereby pulverizing the polysaccharide. The nozzles are angled such that the jets collide against each other at a point distant from the outlets of the nozzles and at an appropriate angle and/or the number of ejecting steps is adjusted to subject the polysaccharide to an appropriate number of pulverizing cycles. That is, the angle of collision between the jets and/or the number of pulverizing cycles is adjusted such that the polysaccharide is pulverized to an average particle length which is equal to or less than ¼ of the initial average particle length, specifically equal to or less than 10 μm, while a reduction in degree of polymerization is kept less than 10%.

FIG. 1 illustrates one embodiment wherein the pulverizing method of the invention is carried out. The system includes a raw material tank 1, a piston pump 2, a pulverizing chamber 3, a pair of angled nozzles 4a, 4b disposed in the chamber, a heat exchanger 5, and a conduit providing fluid communication between the components. A polysaccharide liquid dispersion is fed from the tank 1 to the pump 2 where it is compressed and then discharged under pressure from a pair of nozzles 4a, 4b to form a pair of jets so that the jets collide against each other at an angle θ for thereby pulverizing the polysaccharide. The once collided and pulverized polysaccharide liquid dispersion is delivered to the heat exchanger 5 where it is cooled and then fed back to the tank 1. The procedure is repeated to carry out a desired number of pulverizing cycles.

The apparatus used in the pulverizing method of the invention may be a high-pressure homogenizer adapted to force a process fluid through a gap of a valve under a high pressure. Such homogenizers are commercially available and include "Homogenizer" by Sanwa Machine Co., Inc., "Ultimaizer System" by Sugino Machine Co., Ltd., "Micro-Fluidizer" by Mizuho Industrial Co., Ltd., and high-pressure homogenizer by APV Gaulin, with the Ultimaizer system being preferred. Preferred is an apparatus including a pulverizing chamber where the angle θ of collision between fluid jets is variable as described in JP-A 10-337457.

The collision angle θ is preferably in a range of 95° to 178°, and more preferably 100° to 170°. When the nozzles are oriented to define an angle of smaller than 95°, for example, an angle of 90°, that is, to achieve perpendicular collision, the nozzle structure tends to allow more jets of liquid dispersion to collide directly against the chamber wall rather than colliding against each other. The direct collision against the wall, even if once, often results in a polymerization degree reduction of more than 10%. When the collision angle is larger than 178°, for example, equal to 180°, that is, to achieve head-on collision, a substantial quantity of collision energy may be produced to induce a noticeable reduction of degree of polymerization even after a single collision.

The number of pulverizing cycles is typically in a range of 1 to 200, and preferably 5 to 120. Too much pulverizing cycles may cause to polysaccharide a reduction of more than 10% in the degree of polymerization. It is important to determine an optimum number of pulverizing cycles in order to achieve subdivision to an average particle length equal to or less than 10 μm.

In the practice of the invention, a polysaccharide having an initial average particle length is pulverized until the polysaccharide is subdivided to an average particle length which is equal to or less than ¼ of the initial average particle length, preferably in a range of ⅕ to 1/100, more preferably ⅙ to 1/50, and most preferably 1/7 to 1/20 of the initial average particle length. Specifically, polysaccharide is pulverized so as to provide an average particle length of equal to or less than 10 μm, preferably 0.01 to 9 μm, more preferably 0.1 to 8 μm, and most preferably 0.1 to 5 μm.

It is noted that particles of fibrillated cellulose have a length in one direction and an breadth in a direction perpendicular to the one direction. Thus the polysaccharide particles as pulverized also have an average particle breadth which is preferably equal to or less than 10 μm, more preferably 0.01 to 9 μm, most preferably 0.1 to 8 μm. Within this range, a reduction in degree of polymerization of polysaccharide is suppressed to 10% or less. The method of determining the average particle breadth will be described later in Example.

As pulverizing cycles are repeated, the pulverized liquid elevates its temperature. Preferably after every wet pulverization, the pulverized liquid is fed to the heat exchanger where it is cooled, typically to a temperature of 4° C. to 20° C., preferably 5° C. to 15° C.

The wet pulverizing method of the invention ensures that polysaccharide experiences a reduction of less than 10%, especially 0 to 8%, in the degree of polymerization on the course of pulverization. The method of measuring the degree of polymerization of polysaccharide may resort to a weight, number or viscosity averaging technique because only a percent reduction of the degree of polymerization is of significance. It suffices that the reduction of the degree of polymerization is less than 10% regardless of the method of determining a degree of polymerization.

The method of the invention pulverizes polysaccharide into finely divided polysaccharide, from which a fraction of submicron particles can be recovered by centrifuging the finely dispersed liquid and collecting the supernatant. Typically a fraction of submicron particles having an average particle length of less than 1 μm is obtained, in which finely divided polysaccharide has experienced a reduction of less than 10% in degree of polymerization.

In the practice of the invention, other components may be added to the liquid dispersion of polysaccharide in the dispersing medium as long as the objects of the invention are not compromised. Such components include water-soluble high-molecular weight substances, humectants, surfactants, flavors, sweeteners, parabens, preservatives, and dyes. All these additional components should have an average particle diameter which ensures passage through the conduit of the pulverizing system.

Suitable water-soluble high-molecular weight substances include calcium secondary phosphate dihydrate and anhydride, calcium primary phosphate, calcium tertiary phosphate, calcium carbonate, calcium pyrophosphate, aluminum hydroxide, alumina, insoluble sodium metaphosphate, magnesium tertiary phosphate, magnesium carbonate, calcium sulfate, and methyl polymethacrylate in microparticulate form.

Suitable humectants include sorbitol, glycerol, ethylene glycol, propylene glycol, 1,3-butylene glycol, polyethylene glycol and xylitol, alone or in admixture.

Suitable surfactants include anionic surfactants such as sodium lauryl sulfate, nonionic surfactants such as decaglyceryl laurate and myristic acid diethanol amide, ampholytic surfactants such as betaines. They may be used to improve the dispersion after compounding and pulverization.

Suitable flavors include menthol, carvone, anethol, methyl salicylate, limonene, n-decyl alcohol, citronellol, vanillin, peppermint oil, spearmint oil, clove oil, and eucalyptus oil, alone or in admixture.

Additionally, sweeteners such as saccharin sodium, stevioside, glycyrrhizin and perillartine; preservatives such as sodium benzoate, parabens (e.g., methylparaben, propylparaben), sorbic acid, sodium sorbate and potassium sorbate; pharmaceutical agents such as lysozyme chloride, dextranase chlorohexidine, sorbic acid, cetyl pyridinium chloride, triclosan, ε-aminocaproic acid, tranexamic acid, azulene, vitamin E1, sodium fluoride, sodium monofluorophosphate, quaternary ammonium compounds, and hexametaphosphates; and coloring agents may be compounded depending on the intended use of the pulverized polysaccharide.

EXAMPLE

Examples are given below for illustrating the invention, but are not intended to limit the invention thereto.

The average degree of polymerization, average particle length and average particle breadth were determined as follows.

Degree of Polymerization

An intrinsic viscosity [η] of a cellulose sample was measured in a copper ethylene diamine solution according to the procedure described in the Cellulose Society Ed., Dictionary of Cellulose, 2000, p. 80. From this viscosity, a degree of polymerization is calculated according to the equation between intrinsic viscosity and degree of polymerization: $[\eta]$ $(ml/g)=1.67\times[Dp]^{0.71}$, described ibid.

In Examples 4 and 5, a degree of polymerization was measured otherwise.

Average Particle Length and Breadth

A cellulose sample was dispersed in deionized water in a concentration of 0.001% by weight, and a photograph of particles was taken under a polarizing microscope BHA (Olympus Optical Co., Ltd.). Using an image analysis software Image-Pro Plus 4.5.2 (Media Cybernetics), the length and breadth of more than 50 particles were measured. An average of these measurements was computed. For those cellulose dispersions which had undergone 30 or more pulverizing cycles, a sample was dripped on a 200-mesh copper grid and dyed with 2 wt % uranyl acetate, after which an image was taken under a transmission electron microscope JEM-100CX (Nippon Electron Co., Ltd.) with an accelerating voltage of 80 kV. Using the image analysis software Image-Pro Plus 4.5.2 (Media Cybernetics), the particle length and breadth were measured. More than 50 measurements were made and averaged.

Example 1

Figure 2A:
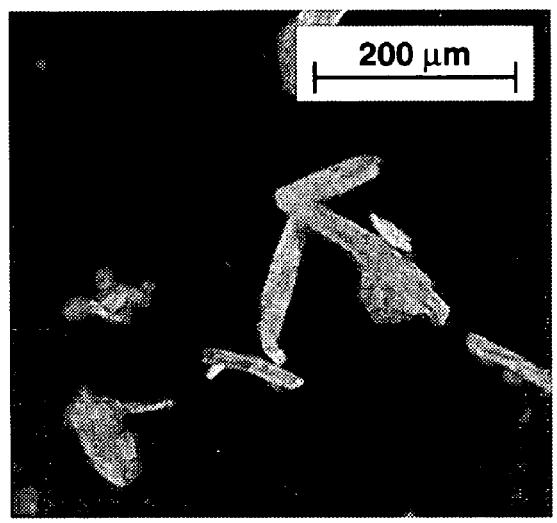
FIGS. 2a, 2b and 2c are photographs under polarizing microscope of Funacel II at the initial, after 5 collision cycles, and after 50 collision cycles in a 1 wt % dispersion form, respectively.
Figure 2B:
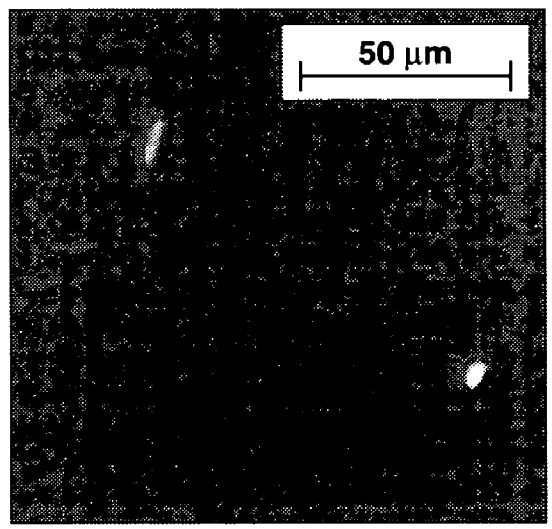
Figure 2C:
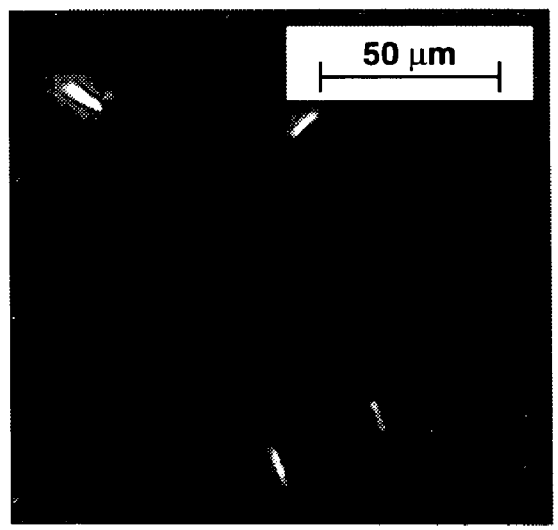

Funacel II (Funakoshi Co., Ltd.) which is a crystalline cellulose powder having an average degree of polymerization of 220, an average particle length of 28 μm and an average particle breadth of 11 μm was added to deionized water and dispersed therein to form 400 g of a dispersion having a concentration as shown in Table 1. Using a high-pressure pulverizing system, as shown in FIG. 1, Altemaizer Model HJP-25005 by Sugino Machine Co., Ltd. in which a pair of nozzles were angled in the chamber to provide a collision angle θ of 170°, the dispersion was ejected for collision under 200 MPa. The pulverization was repeated 1 to 180 cycles. The pulverized cellulose had an average degree of polymerization, average particle length and average particle breadth which are shown in Table 1. FIG. 2 shows photographs of cellulose under a polarizing microscope. FIG. 2*a* is a photomicrograph of the unprocessed cellulose, i.e., starting Funacel II; FIG. 2*b* is a photomicrograph after a 1 wt % dispersion of Funacel II was collided 5 cycles; FIG. 2*c* is a photomicrograph after the dispersion was collided 50 cycles.

Next, 20 g of the processed liquid was placed in a dish having a diameter of 120 mm, where it was dried at 105° C. for 2 hours while keeping the dish horizontal. Drying resulted in a film which was determined for transparency and thickness at ten points, with a standard deviation of film thickness calculated. The results are reported in Table 1. The film was found uniform, indicating that the pulverized product consisted of polymers whose degree of polymerization was kept substantially unchanged as demonstrated by a reduction of less than 10% in degree of polymerization.

Figure 3:
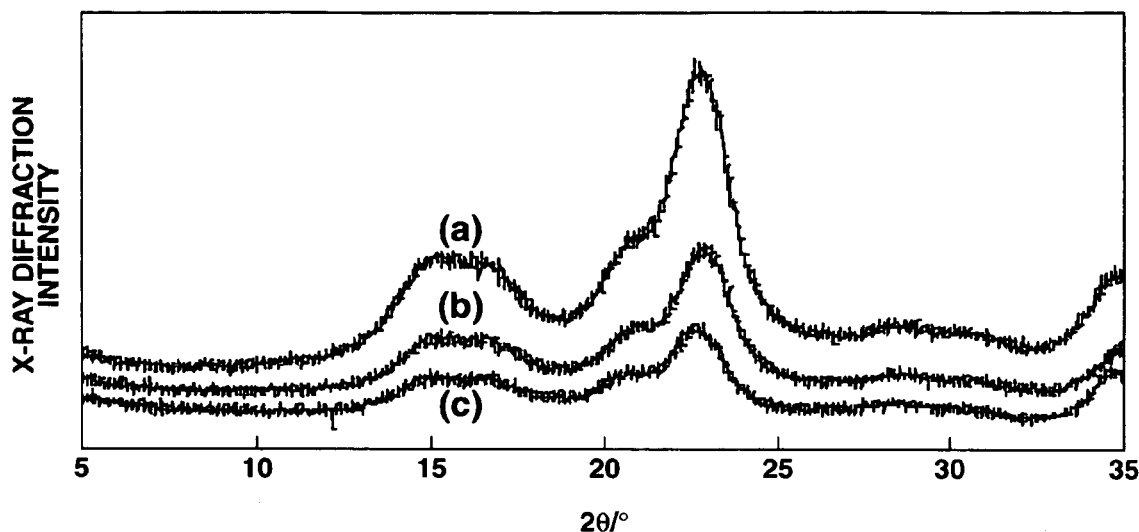
FIG. 3 is a X ray analysis diagram of Funacel II at the initial, after 50 and 130 collision cycles.

A piece of each film reported in Table 1 was analyzed on a X ray diffractometry analyzer Model Rigaku Rint 2000F (Rigaku Instrument Co., Ltd.), with Cu Ka-line and a diffraction angle of 5-35°. The results of X-ray diffractometry are shown in FIG. 3. A crystallinity was determined from the charts using the method of Kai, A and Ping, X, Polymer Journal, 22 (11), p. 955 (1999). Curve (a) corresponding to the starting cellulose, Funacel II gave a crystallinity of 70%, curve (b) corresponding to the product after 50 pulverizing cycles of a 1 wt % dispersion gave a crystallinity of 69%, and curve (c) corresponding to the product after 130 pulverizing cycles of a 1 wt % dispersion gave a crystallinity of 70%, proving that the crystallinity was also kept unchanged.

Samples of 1 wt % cellulose dispersion at the initial and after 30 and 180 cycles of wet pulverization were dried at 105° C. for 2 hours and examined for infrared absorption behavior by a Fourier transform infrared spectrometer (JASCO). The results are shown as curves (a), (b) and (e) in FIG. 4. As compared with the starting cellulose, the pulverized cellulose products showed no changes in absorption peaks of hydroxyl and other groups, proving that cellulose molecules experienced no chemical change during pulverization.

A sample of 1 wt % cellulose dispersion after 100 cycles of wet pulverization was centrifuged under $1.7 \times 10^3$ G. In the supernatant, a clear solution portion was observed where a cellulose fraction corresponding to 1.4% by weight of the entire cellulose was present. It was seen that wet pulverizing by the inventive method caused cellulose to be finely divided and dispersed to a nano-order of less than 1 μm. A sample of the supernatant was dried at 105° C. for 2 hours and examined for infrared absorption behavior by a Fourier transform infrared spectrometer, with the result being shown as curve (d) in FIG. 4. For this dry sample, a degree of polymerization was determined to be 220, indicating no reduction from the initial. These results that the pulverized product in the centrifugal supernatant kept unchanged both the chemical structure and the molecular weight indicate that a finely divided product without a lowering of molecular weight is obtained by centrifuging the pulverized dispersion.

Figure 4:
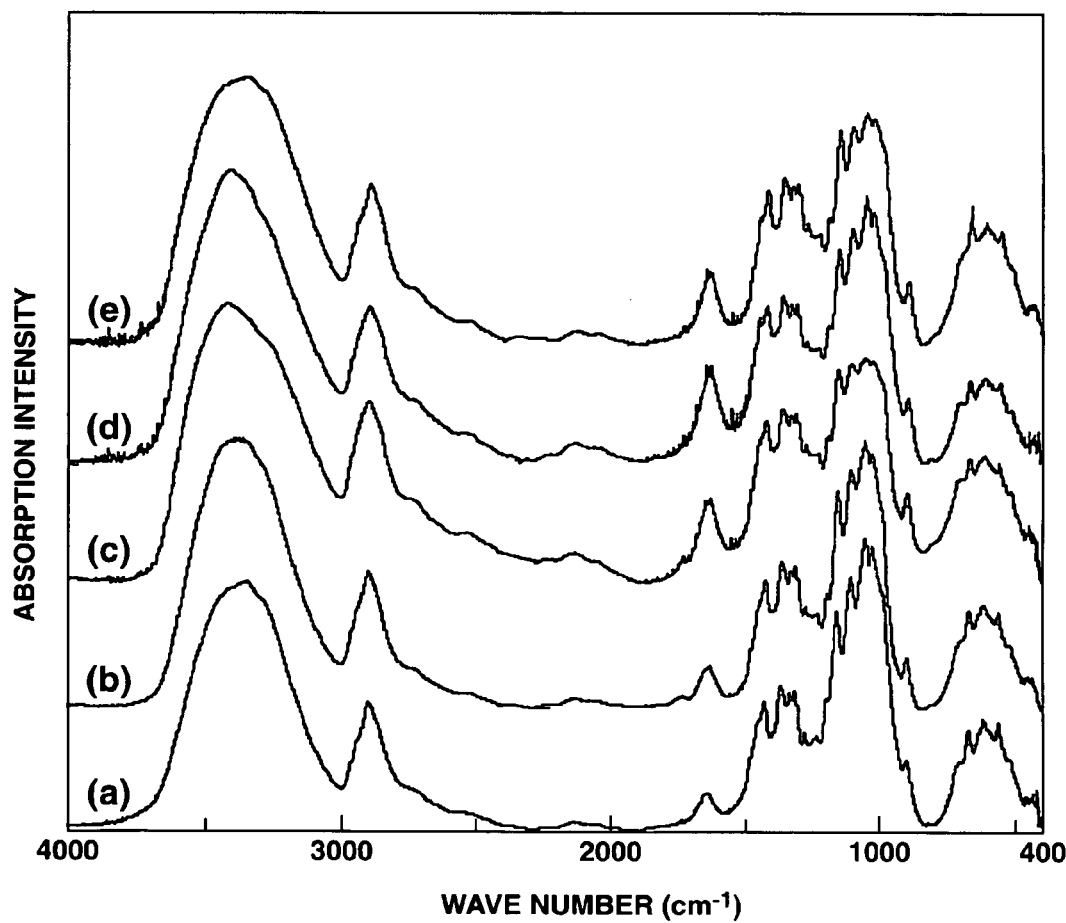
FIG. 4 is a diagram showing infrared spectra of Funacel II at the initial, after 30, 100, and 180 collision cycles.

In FIG. 4, curve (a) is an infrared absorption spectrum of the starting cellulose (Funacel II), curve (b) is an infrared absorption spectrum of the product after 30 pulverizing cycles of a 1 wt % Funacel II dispersion, curve (c) is an infrared absorption spectrum of a precipitate from the product after 100 pulverizing cycles of a 1 wt % Funacel II dispersion, curve (d) is an infrared absorption spectrum of a supernatant from the same product as (c), and curve (e) is an infrared absorption spectrum of the product after 180 pulverizing cycles of a 1 wt % Funacel II dispersion.

TABLE 1

Wet pulverized products of crystalline cellulose, Funacel II

| Pulverizing cycles | Cellulose concentration (wt %) | Degree of polymerization | Average particle length (μm) | Average particle breadth (μm) | Film transparency | Film thickness (μm) | Film thickness standard deviation (μm) |
|---|---|---|---|---|---|---|---|
| 0 (starting cellulose) | 1 | 220 | 28 | 11 | opaque | 20 | 8 |
| 1 | 1 | 210 | 7 | 4 | transparent | 20 | 2 |

TABLE 1-continued

Wet pulverized products of crystalline cellulose, Funacel II

| Pulverizing cycles | Cellulose concentration (wt %) | Degree of polymerization | Average particle length (μm) | Average particle breadth (μm) | Film transparency | Film thickness (μm) | Film thickness standard deviation (μm) |
|---|---|---|---|---|---|---|---|
| 5 | 1 | 210 | 5 | 3 | transparent | 20 | 2 |
| 50 | 1 | 210 | 4 | 3 | transparent | 20 | 2 |
| 130 | 1 | 210 | 4 | 3 | transparent | 20 | 2 |
| 180 | 1 | 210 | 3 | 3 | transparent | 20 | 1 |
| 28 | 2 | 210 | 4 | 3 | transparent | 40 | 3 |
| 119 | 2 | 210 | 4 | 3 | transparent | 40 | 2 |

Example 2

4 g of the crystalline cellulose powder used in Example 1 (Funacel II) was added to 396 g of deionized water and dispersed therein. Using a high-pressure pulverizing system, Altemaizer Model HJP-25005 by Sugino Machine Co., Ltd. in which a pair of nozzles were angled in the chamber to provide a collision angle θ of 100°, the dispersion was ejected for collision under 250 MPa. Pulverization was repeated 10 cycles. The pulverized cellulose had an average particle length of 8 μm. The pulverized dispersion was dried at 80° C. for 24 hours, after which its degree of polymerization was measured to be 202, which indicated a reduction of 8% in degree of polymerization.

Example 3

16 g of the crystalline cellulose powder used in Example 1 (Funacel II) was added to 384 g of deionized water and dispersed therein. Using a high-pressure pulverizing system, Altemaizer Model HJP-25005 by Sugino Machine Co., Ltd. in which a pair of nozzles were angled in the chamber to provide a collision angle θ of 175°, the dispersion was ejected for collision under 250 MPa. Pulverization was repeated 15 cycles. The pulverized cellulose had an average particle length of 7 μm. The pulverized dispersion was dried at 80° C. for 24 hours, after which its degree of polymerization was measured to be 205, which indicated a reduction of 7% in degree of polymerization.

Example 4

Chitin available from Wako Junyaku Co., Ltd. was milled on a stamp mill. The milled particles were passed through a 125 μm mesh and determined for size by microscopic observation and image analysis as in Example 1. In this way, a chitin powder having an average particle length of 60 μm and an average particle breadth of 40 μm was obtained. This chitin powder was found to have a degree of polymerization of 150 when measured according to "the direct measurement of chitin molecular weight" in the Journal of Chitin/Chitosan Research Society, vol. 3, pages 190-191, by dissolving chitin in a calcium chloride dihydrate methanol solution, measuring the viscosity of the solution, and computing a molecular weight therefrom. 10 g of the chitin powder was added to 800 g of deionized water and dispersed therein. Using a high-pressure pulverizing system, Altemaizer Model HJP-25005 by Sugino Machine Co., Ltd. in which a pair of nozzles were angled in the chamber to provide a collision angle θ of 165°, the dispersion was ejected for collision under 200 MPa. Pulverization was repeated 15 cycles. The pulverized dispersion was determined for size by microscopic observation and image analysis as in Example 1, finding an average particle length of 1.2 μm and an average particle breadth of 25 nm. The degree of polymerization after pulverization was 138, which indicated a reduction of 8% in degree of polymerization. Dry samples before and after the pulverization were examined for infrared absorption behavior by a Fourier transform infrared spectrometer, finding no change in absorption behavior. This indicated that pulverization introduced no change in chemical structure. A sample of the pulverized dispersion was centrifuged under $1.7 \times 10^3$ G. In the supernatant, a clear solution portion was observed where a finely divided fraction corresponding to 25.4% by weight of the entire cellulose was present.

Example 5

Low-substituted hydroxypropyl cellulose was carbanilated. This modified low-substituted hydroxypropyl cellulose had a degree of polymerization of 450 as measured by the GPC-MALLS method, an average particle length of 110 μm, and a molar substitution of 0.2. 4 g of the modified low-substituted hydroxypropyl cellulose powder was added to 396 g of deionized water and dispersed therein. Using a high-pressure pulverizing system, Altemaizer Model HJP-25005 by Sugino Machine Co., Ltd. in which a pair of nozzles were angled in the chamber to provide a collision angle θ of 100°, the dispersion was ejected for collision under 250 MPa. Pulverization was repeated 20 cycles. The pulverized cellulose had an average particle length of 7 μm. The pulverized dispersion was dried at 80° C. for 24 hours, after which its degree of polymerization was similarly measured to be 440, which indicated a reduction of 2.2% in degree of polymerization.

Next, 50 g of the pulverized dispersion was placed in a dish having a diameter of 120 mm, where it was dried at 105° C. for 2 hours while keeping the dish horizontal. Drying resulted in a transparent film which was determined for thickness at ten points, finding an average thickness of 51 μm. The standard deviation of film thickness was 7 μm, demonstrating formation of a uniform film.

Comparative Example 1

4 g of the crystalline cellulose powder used in Example 1 (Funacel II) was added to 396 g of deionized water and dispersed therein. Using a high-pressure pulverizing system, Altemaizer Model HJP-25005 by Sugino Machine Co., Ltd. in which a pair of nozzles were angled in the chamber to provide a collision angle θ of 90°, the dispersion was ejected under 250 MPa. Pulverization was repeated 15 cycles. The pulverized cellulose had an average particle length of 8 μm. The pulverized dispersion was dried at 80° C. for 24 hours, after which its degree of polymerization was measured to be 185, which indicated a reduction of 16% in degree of polymerization.

Comparative Example 2

8 g of the crystalline cellulose powder used in Example 1 (Funacel II) was added to 392 g of deionized water and dispersed therein. Using a high-pressure pulverizing system, Altemaizer Model HJP-25005 by Sugino Machine Co., Ltd. in which a pair of nozzles were angled in the chamber to provide a collision angle θ of 90°, the dispersion was ejected under 250 MPa. Pulverization was repeated 210 cycles. The pulverized cellulose had an average particle length of 8 μm. The pulverized dispersion was dried at 80° C. for 24 hours, after which its degree of polymerization was measured to be 190, which indicated a reduction of 14% in degree of polymerization.

Japanese Patent Application No. 2004-090799 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of wet pulverizing a polysaccharide in particle form having an initial average particle length, comprising ejecting a liquid dispersion of polysaccharide from a pair of nozzles under a pressure of 70 to 250 MPa to form a pair of jets so that the jets collide against each other for thereby pulverizing the polysaccharide, wherein
   the nozzles are angled such that the jets collide against each other at a point distant from outlets of the nozzles, whereby the polysaceharide is pulverized to an average particle length which is equal to or less than ¼ of the initial while undergoing a reduction in degree of polymerization of less than 10%;
wherein the angle of collision between the jets is in a range of 95 to 178 degrees, and
wherein the number of pulverizing cycles is from 1 to 200.

2. The method of claim 1, wherein the polysaccharide is pulverized to an average particle length which is equal to or less than 10 μm while undergoing a reduction in degree of polymerization of less than 10%.

3. The method of claim 2, wherein the polysaceharide is pulverized to an average particle breadth which is equal to or less than 10 μm while undergoing a reduction in degree of polymerization of less than 10%.

4. The method of claim 1, further comprising, after the wet pulverizing step, centrifuging the liquid dispersion of polysaccharide to collect polysaccharide submicron particles having an average particle length which is less than 1 μm.

5. The method of claim 1, wherein the polysaccharide is selected from among cellulose or derivatives thereof, chitin or derivatives thereof, and chitosan or derivatives thereof.

6. The method of claim 5, wherein the cellulose is crystalline cellulose as prescribed in the Japanese Pharmacopoeia, 14th Edition.

* * * * *